United States Patent
Ochi

(10) Patent No.: US 9,333,808 B2
(45) Date of Patent: May 10, 2016

(54) PNEUMATIC TIRE

(75) Inventor: Naoya Ochi, Higashimurayama (JP)

(73) Assignee: BRIDGESTONE CORPORATION, Tokyo (JP)

( * ) Notice: Subject to any disclaimer, the term of this patent is extended or adjusted under 35 U.S.C. 154(b) by 790 days.

(21) Appl. No.: 13/583,530

(22) PCT Filed: Mar. 4, 2011

(86) PCT No.: PCT/JP2011/001297
§ 371 (c)(1),
(2), (4) Date: Sep. 7, 2012

(87) PCT Pub. No.: WO2011/111353
PCT Pub. Date: Sep. 15, 2011

(65) Prior Publication Data
US 2012/0325385 A1    Dec. 27, 2012

(30) Foreign Application Priority Data
Mar. 8, 2010   (JP) .................................. 2010-051076

(51) Int. Cl.
*B60C 11/11*      (2006.01)
*B60C 11/03*      (2006.01)
*B60C 11/12*      (2006.01)

(52) U.S. Cl.
CPC ............... *B60C 11/12* (2013.01); *B60C 11/033* (2013.04); *B60C 11/0304* (2013.04);
(Continued)

(58) Field of Classification Search
CPC  B60C 11/03; B60C 11/0304; B60C 11/0306; B60C 11/0309; B60C 11/033; B60C 11/0332; B60C 11/11; B60C 2011/1213; B60C 11/04
USPC ......... 152/209.8, 209.18, 209.25, 902, 209.1; D12/507, 513, 539, 545, 574, 580
See application file for complete search history.

(56) References Cited

U.S. PATENT DOCUMENTS

| | | | | |
|---|---|---|---|---|
| D236,888 S | * | 9/1975 | Verdier | ........................ D12/513 |
| 4,546,808 A | * | 10/1985 | Fontaine et al. | ........... 152/209.9 |
| 2011/0297282 A1 | * | 12/2011 | Ochi | ........................ B60C 11/11 152/209.1 |

FOREIGN PATENT DOCUMENTS

CN    102395476 A    3/2012
EP    0 681 929 A1    11/1995
(Continued)

OTHER PUBLICATIONS

JP 2001-322408, Nov. 2001, English language machine translation [https://www.jplatpat.inpit.go.jp/web/all/top/BTmTopEnglishPage].*
(Continued)

*Primary Examiner* — Eric Hug
(74) *Attorney, Agent, or Firm* — Sughrue Mion, PLLC

(57) ABSTRACT

Provided is a pneumatic tire in which a polygonal block group is provided between two circumferential main grooves in a tread ground contact width, the polygonal block group comprising a plurality of polygonal blocks with five or more sides which are demarcated by thin grooves and arranged in at least two longitudinal rows and a plurality of lateral rows, the longitudinal rows being arranged so that the polygonal blocks included in adjacent longitudinal rows differ in phase from each other in a tire circumferential direction; side block rows are provided, one on each of the two sides in the tire width direction of the polygonal block group, the side block rows comprising a plurality of side blocks which are demarcated by the circumferential main grooves, lateral grooves, and the thin grooves and arranged in the tire circumferential direction; and a length in the tire circumferential direction of a first side block included in a first side block row provided on one side is larger than the length in the tire circumferential direction of a second side block included in a second side block row provided on the other side.

6 Claims, 4 Drawing Sheets

(52) U.S. Cl.
CPC ............ *B60C 11/0332* (2013.04); *B60C 11/11* (2013.01); *B60C 2011/0381* (2013.04); *B60C 2011/1209* (2013.04); *B60C 2011/1213* (2013.04); *B60C 2011/1227* (2013.04); *B60C 2011/1338* (2013.04)

(56) References Cited

FOREIGN PATENT DOCUMENTS

| EP | 2 397 345 A1 | | 12/2011 | |
|----|---|---|---|---|
| JP | 8-002215 A | | 1/1996 | |
| JP | 8-318710 A | | 12/1996 | |
| JP | 2001-322408 | * | 11/2001 | |
| JP | 2001-322408 A | | 11/2001 | |
| JP | 2002-192914 A | | 7/2002 | |
| JP | 2007-145209 | * | 6/2007 | |
| JP | 2010-30466 | * | 2/2010 | |
| JP | 2010-030466 A | | 2/2010 | |
| WO | 96/36501 A1 | | 11/1996 | |
| WO | 98/31555 A1 | | 7/1998 | |
| WO | 2010/092742 A1 | | 8/2010 | |
| WO | WO 2010/092742 | * | 8/2010 | B60C 11/11 |

OTHER PUBLICATIONS

JP 2010-030466, Feb. 2010, English language machine translation [https://www.jplatpat.inpit.go.jp/web/all/top/BTmTopEnglishPage].*

Communication dated Feb. 12, 2015 from the State Intellectual Property Office of People's Republic of China in counterpart application No. 201180023179.7.

International Search Report of PCT/JP2011/001297, dated Mar. 29, 2011.

Extended European Search Report, dated Jan. 3, 2014, issued in corresponding European Patent Application No. 11753019.6.

Chinese Office Action, dated Jul. 23, 2014, issued in corresponding Chinese Patent Application No. 201180023179.7.

* cited by examiner

P-P SECTIONAL VIEW

PNEUMATIC TIRE

CROSS REFERENCE TO RELATED APPLICATIONS

This application is a National Stage of International Application No. PCT/JP2011/001297 filed Mar. 4, 2011, claiming priority based on Japanese Patent Application No. 2010-051076, filed Mar. 8, 2010, the contents of all of which are incorporated herein by reference in their entirety.

TECHNICAL FIELD

The present invention relates to a pneumatic tire in which a polygonal block group is provided between two circumferential main grooves in a tread ground contact width, the polygonal block group comprising a plurality of polygonal blocks with five or more sides which are demarcated by thin grooves and arranged in at least two longitudinal rows and a plurality of lateral rows.

BACKGROUND ART

Conventionally, in a pneumatic tire for winter season, a block pattern has been most commonly used as a pattern of a tread section. For example, as shown in FIG. 5, relatively large blocks of substantially the same size are demarcated by main grooves and lateral grooves, which grooves serve to generate a snow column shearing force and the like so as to improve on-snow performance, and sipes are formed in the tread blocks so as to improve on-ice performance (see Patent Document 1).

RELATED ART DOCUMENTS

Patent Document

Patent Document 1: Japanese Patent Application Laid-open No. 2002-192914

SUMMARY OF INVENTION

Technical Problem

If a block pattern with a relatively large ground contact area is uniformly arranged in a tread ground contact surface as seen from the pneumatic tire shown in FIG. 5, each block generally has increased rigidity, resulting in difficulty in providing sufficient flexibility to each block when the tire is in contact with the ground surface. As a result, it is not easy to provide sufficient road surface followability to the blocks, in particular upon stepping-in or kicking-out.

As a result of intensive study directed towards solving the above-mentioned problem, the inventors found that compared to the conventional relatively large blocks provided in the tread ground contact surface, densely arranged polygonal blocks with five or more sides and a relatively small ground contact area can improve on-snow and on-ice performance and ensure better road surface followability of the blocks. This is because in the case of the polygonal blocks, the total edge length and the number of edges are increased and each block can deform more flexibly than conventional one when the tire is rolling under load.

However, uniformly arranging relatively small blocks of the same size as with the conventional block pattern would lead to, in particular, a load of external force acting on the blocks located outside in the tread width direction upon cornering, which results in poor block rigidity and suspected decrease in the on-ice performance, on-snow performance, and handling performance such as dry performance and wet performance.

Further, as it is known, in a shoulder region of a tire tread section (outside region in the width direction of the tread section), when a surface of the tread section is pressed against a flat road surface, a belt layer located inside the shoulder region in a radial direction is forcibly stretched and tends to return to its original shape, as a result of which shoulder wear and step-down wear can easily occur particularly in the block land section located in the shoulder region among the blocks forming the tread section.

The present invention has been made in view of the above problem, and an object of the present invention is therefore to provide a pneumatic tire which enables a higher level of handling performance to be realized and causes less partial wear in the shoulder region by achieving proper size and arrangement of the blocks in the tread.

Solution to Problem

The present invention is aimed at solving the above-mentioned problem. That is to say, a pneumatic tire of the present invention is characterized in that:

a polygonal block group is provided between two circumferential main grooves in a tread ground contact width, the polygonal block group comprising a plurality of polygonal blocks with five or more sides which are demarcated by thin grooves and arranged in at least two longitudinal rows and a plurality of lateral rows, the longitudinal rows being arranged so that the polygonal blocks included in adjacent longitudinal rows differ in phase from each other in a tire circumferential direction;

side block rows are provided, one on each of the two sides in the tire width direction of the polygonal block group, the side block rows comprising a plurality of side blocks which are demarcated by the circumferential main grooves, lateral grooves, and the thin grooves and arranged in the tire circumferential direction; and a length in the tire circumferential direction of a first side block included in a first side block row provided on one side is larger than the length in the tire circumferential direction of a second side block included in a second side block row provided on the other side.

Here, the "tread ground contact width" means a maximum width of a contact surface between a tire surface and a ground surface in such a condition that the tire is assembled to a standard rim with an applicable size of industrial standard which is valid in a region where the tire is produced or used, for example, standards described in the "Year Book" of the Tire and Rim Association Inc. in the USA, the "Standards Manual" of the European Tyre and Rim Technical Organization in Europe, and "JATMA Year Book" of the Japan Automobile Tyre Manufacturers Association in Japan, and a maximum load (maximum load capacity) and a pneumatic pressure corresponding to the maximum load for a single wheel with the applicable size of the relevant standard are applied to the tire.

The "longitudinal rows" refer to the rows comprising the polygonal blocks arranged at a predetermined interval in the circumferential direction. The longitudinal rows are arranged in two or more rows in the tire width direction.

With regard to the arrangement of the polygonal blocks, "differ in phase from each other in the tire circumferential direction" means a state in which the plurality of polygonal blocks of the same shape included in one longitudinal row are arranged in a staggered manner with respect to each of the polygonal blocks included in an adjacent longitudinal row in the circumferential direction so as to be shifted from each other.

Further, in the pneumatic tire according to the present invention, it is preferred that a center in the tire width direction of the polygonal block group be offset from a tire equatorial plane, and a distance in the tire width direction between the first side block row and the tire equatorial plane be larger than the distance in the tire width direction between the second side block row and the tire equatorial plane.

The "center in the tire width direction of the polygonal block group" means a central part in the tire width direction of a region in which the polygonal blocks are densely arranged. That is to say, if the polygonal blocks are arranged in a plurality of rows, it means a central part between each line passing through the outermost point in the tire width direction of each of the two polygonal block rows located at the outermost side in the tire width direction and parallel to the tire equatorial plane.

With regard to the center in the tire width direction of the polygonal block group, "offset from a tire equatorial plane" means a state in which the center in the tire width direction of the polygonal block group is not located on the tire equatorial plane but deviated from the tire equatorial plane so as to be located in one of two tread half width regions. That is to say, it means a state in which a length in the tire width direction of the polygonal block group is asymmetrical with respect to the tire equatorial plane.

Further, in the pneumatic tire according to the present invention, the center in the tire width direction of the polygonal block group is preferably located in a region having a width of 50% of the tread ground contact width with the tire equatorial plane as a center.

Further, in the pneumatic tire according to the present invention, it is preferred that a side of the first side block and the second side block facing the circumferential main grooves have a linear shape, and a side of the first side block and the second side block facing the polygonal blocks have a complementary shape corresponding to the shape of the adjacent polygonal blocks.

Further, in the pneumatic tire according to the present invention, a side of at least one of the first side block and the second side block facing the circumferential main groove has a zigzag shape, and a side of the first side block and the second side block facing the polygonal blocks have a complementary shape corresponding to the shape of the adjacent polygonal blocks.

Further, in the pneumatic tire according to the present invention, the thin grooves demarcating the polygonal blocks preferably have a depth smaller than that of the circumferential main grooves.

Further, in the pneumatic tire according to the present invention, each of the polygonal blocks preferably has an actual ground contact area of 50 $mm^2$ to 250 $mm^2$. Here, the "actual ground contact area" means a surface area of the polygonal block in an unloaded condition.

Further, in the pneumatic tire according to the present invention, with regard to the polygonal blocks, given that a reference pitch length of the polygonal block group is PL (mm), a width of the polygonal block group is GbW (mm), the number of the polygonal blocks existing in a reference zone of the polygonal block group demarcated by the reference pitch length PL and the width GbW is a, and a negative ratio within the reference zone is N %, a block number density S per unit actual ground contact area of the polygonal block group given by:

$$S = a/(PL \cdot GbW \cdot (1-N/100))$$

preferably is in the range of 0.003 pieces/$mm^2$ to 0.04 pieces/$mm^2$.

Here, the "reference pitch length of the polygonal block group" refers to the minimum unit of repetitive pattern of the polygonal blocks in one longitudinal row included in the polygonal block group existing in the tread ground contact width. For example, when the repetitive pattern is defined by one polygonal block and the grooves demarcating that polygonal block, the reference pitch length of the polygonal block is the sum of the length in the tire circumferential direction of one polygonal block and the length in the tire circumferential direction of one groove adjacent to that polygonal block.

The "width of the polygonal block group" refers to the length in the tire width direction of the polygonal block group existing in the tread ground contact width.

The "actual ground contact area" of the polygonal block group means the total area of all polygonal blocks existing in the reference zone of the polygonal block group. For example, it refers to the area obtained by subtracting the area of grooves demarcating each polygonal block from the area of the above-mentioned reference zone defined by the product of the reference pitch length PL and the width GbW.

Effect of the Invention

According to the present invention, it is possible to provide a pneumatic tire which has better handling performance and causes less partial wear than the conventional pneumatic tire by achieving proper size and arrangement of the blocks in the tread.

DESCRIPTION OF EMBODIMENTS

Figure 1:
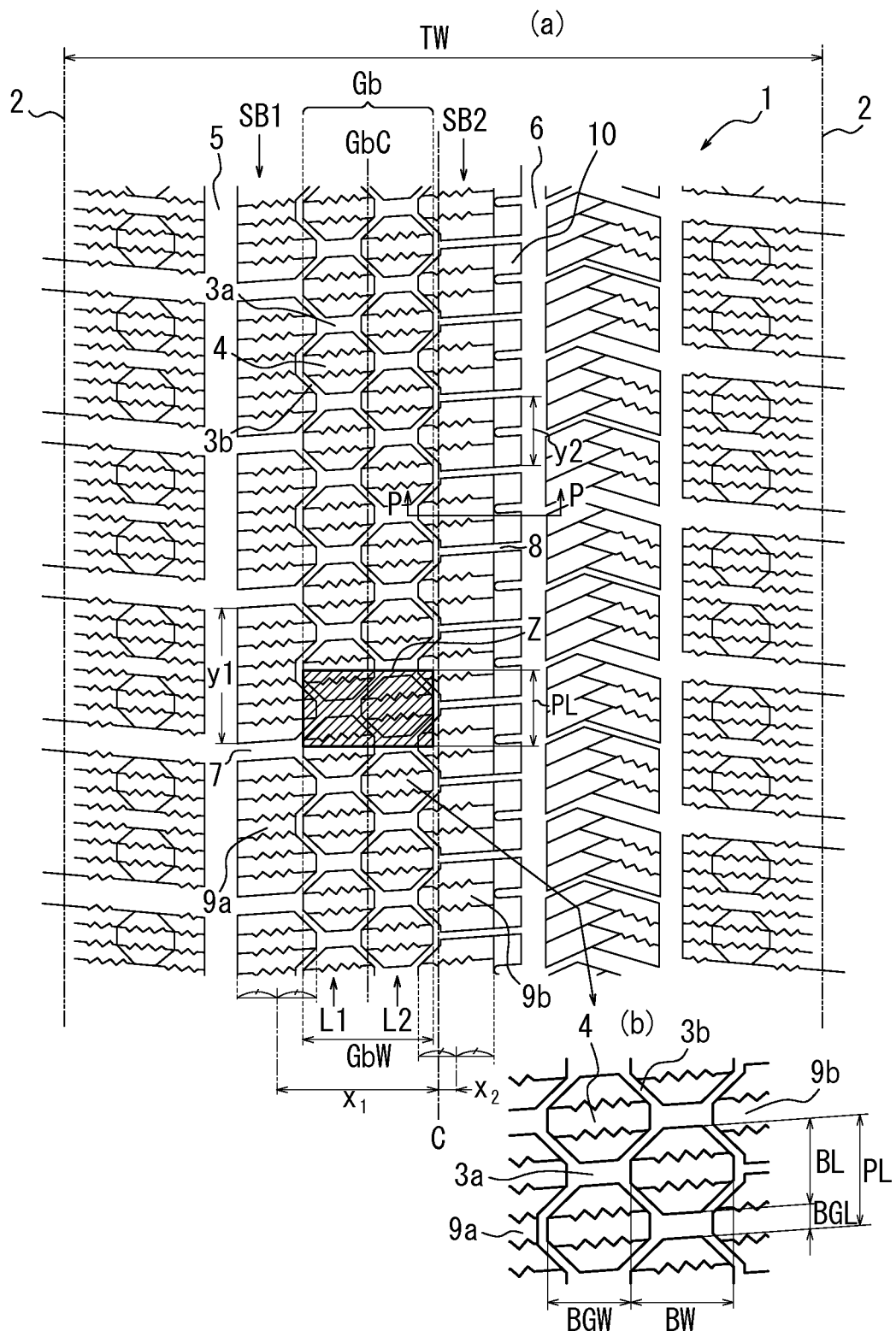
FIG. 1(a) is a partially developed view illustrating a tread pattern of an embodiment of a pneumatic tire according to the present invention.
FIG. 1(b) is partially enlarged view of FIG. 1(a)

Hereinafter, embodiments of the present invention will be described with reference to the drawings. FIGS. 1(a) and 1(b) are a partially developed view illustrating a tread pattern of an embodiment of a pneumatic tire (hereinafter referred to as "tire") according to the present invention. Note that, in the drawings, the vertical direction indicates a tread circumferential direction and the horizontal direction (direction perpendicular to an equatorial plane C) indicates a tread width direction.

As shown in FIGS. 1(a) and 1(b), a polygonal block group Gb is arranged partially between tread ground contact ends 2 and 2 (hereinafter referred to as "tread ground contact width TW"), the polygonal block group Gb comprising a plurality of polygonal blocks 4 with five or more sides (hereinafter referred to as "polygonal blocks") which are demarcated by first thin grooves 3a and second thin grooves 3b and densely arranged.

Here, the first thin grooves 3a mean grooves extending substantially in the width direction between the polygonal blocks, and the second thin grooves 3b mean grooves which intersect the first thin grooves 3a. These grooves have such a width that the adjacent polygonal blocks are not completely restrained by each other and each block is individually movable, preferably a width of 0.7 mm to 0.3 mm.

In the case of the tire of this embodiment, as described above, the polygonal block group Gb is configured to include the polygonal blocks 4 densely arranged while ensuring a sufficient groove area. Thus, the total edge length and the edge direction (number of edges facing different directions) of each block can be increased so as to achieve excellent edge effect. As a result, it is possible to improve on-ice and on-snow performance.

Further, since the blocks are demarcated not by sipes but by grooves, the blocks are movable independent of each other in spite of their dense arrangement and can flexibly deform when they are in contact with a ground surface. Thus, ground contact performance of the tread is improved and as a result of which the on-ice and on-snow performance can be effectively improved.

The polygonal blocks 4 are arranged at a predetermined interval in the circumferential direction and in a plurality of, preferably two or more, longitudinal rows in the tire width direction. Further, the polygonal blocks 4 forming adjacent longitudinal rows are arranged to differ in phase from each other in the tire circumferential direction. That is to say, the polygonal blocks 4 are arranged in a staggered manner (like a staggered grid) in the tire circumferential direction.

Here, "differ in phase from each other in the tire circumferential direction" means a state in which centroids of the adjacent polygonal blocks in the tire width direction are not collinear with each other in the tire width direction. For example, in the example shown in FIGS. 1(a) and 1(b), the centroid of the polygonal block included in the polygonal block row L1 is shifted from the centroid of the polygonal block included in the adjacent polygonal block row L2 by half a block in the tire circumferential direction. Thus, in the case of such blocks shifted from the adjacent blocks by half a block in the tire circumferential direction and arranged in a plurality of block rows, looking at the plurality of polygonal blocks arranged on a tread surface in terms of the width direction, the polygonal blocks forming the longitudinal rows are arranged to be in the same phase (that is to say, their centroids are collinear with each other) in every other (i.e. at intervals of one) longitudinal row in the tire width direction.

However, the longitudinal rows differing in phase from each other do not necessarily have to be shifted by half a block as described above. Thus, although not shown, the polygonal blocks forming the longitudinal rows may be in the same phase not in every other longitudinal row but in every few longitudinal rows.

In this way, the polygonal blocks of the polygonal block group are arranged to differ in phase in the tread circumferential direction, as a result of which it is possible to densely arrange the blocks and effectively utilize the space on a tread face. Thus, when the tire is rolling, with the increased number of polygonal blocks formed in the tread surface, the edges of the blocks can successively work and exert more excellent edge effect. In addition, since such a phase-shifted arrangement can allow the blocks adjacent to each other in the tread width direction to contact with the road surface at different times, it is also possible to reduce pattern noise.

In the polygonal block group Gb of the tire 1, it is preferred that the blocks be relatively small, each having an actual ground contact area of 50 mm² to 250 mm².

This is because relatively small blocks have low block rigidity, which allows for increased flexibility of the blocks, improved ground contact performance, and in particular improved on-ice and on-snow performance (performance such as braking, traction, cornering). In addition, since a distance from a central area of the block to a peripheral edge of the block can be reduced by using relatively small blocks, a water film removing effect by the polygonal blocks 4 can be improved. Thus, according to the tire of this embodiment, the on-ice and on-snow performance can be drastically improved by realizing excellent ground contact performance and edge effect as well as effective water film removal by the polygonal blocks 4.

Here, the reason why the actual ground contact area should be in the range of 50 mm² to 250 mm² is given below. On the one hand, if the actual ground contact area is smaller than 50 mm², a block height becomes higher with respect to a block surface area (that is to say, grooves become deeper), which causes collapse of the blocks due to reduced bending rigidity and results in deterioration of handling performance such as dry performance/wet performance/on-ice performance/on-snow performance. On the other hand, if the actual ground contact area is larger than 250 mm², it becomes difficult to obtain sufficient flexibility of the blocks as described above, and hence an improvement in on-ice and on-snow performance cannot be achieved as much as the relatively small blocks. Further, if each individual block is larger, drainage resistance by the polygonal blocks is increased when travelling on a wet road surface, which results in deterioration of hydroplaning performance.

In the polygonal block group Gb of the tire 1, given that a reference pitch length of the polygonal block is PL (mm), a width of the polygonal block group Gb is GbW (mm), the number of the polygonal blocks 4 existing in a reference zone Z (hatched region in FIG. 1(a)) of the polygonal block group Gb demarcated by the reference pitch length PL and the width GbW is a, and a negative ratio within the reference zone Z is N %, a block number density S per unit actual ground contact area of the polygonal block group Gb given by:

$$S=a/(PL \cdot GbW \cdot (1-N/100))$$

preferably is in the range of 0.003 pieces/mm² to 0.04 pieces/mm².

If the block number density S of the polygonal blocks is less than 0.003 pieces/mm², it is difficult to realize the improved edge effect without forming sipes. By contrast, if the block number density S is more than 0.04 pieces/mm², the polygonal blocks become too small to realize desired block rigidity.

Here, when counting the number a of the blocks existing in the reference zone Z, if a block straddles the inside and outside of the reference zone Z and cannot be counted as one, a ratio of a remaining area of the block remaining in the reference zone to the surface area of the block is used to represent the count. For example, the block which straddles the inside and outside of the reference zone Z and only half of which is in the reference zone Z can be counted as ½.

In the above-mentioned equation, the "reference pitch length" refers to the minimum unit of repetitive pattern of the polygonal blocks in one longitudinal block row included in the polygonal block group Gb. For example, if the repetitive pattern is defined by one polygonal block 4 and the thin grooves 3a, 3b demarcating that polygonal block 4, the reference pitch length is the sum of the length in the tire circumferential direction of one polygonal block 4 and the length in the tire circumferential direction of one thin groove 3a adjacent to this polygonal block.

The "actual ground contact area" of the polygonal block group Gb means the total area of all polygonal blocks existing in the reference zone of the polygonal block group Gb. For example, it can be determined by subtracting the area of the first thin grooves 3a and the second thin grooves 3b demarcating each polygonal block 4 from the area of the above-mentioned reference zone defined by the product of the reference pitch length PL and the width GbW of the polygonal block group.

Further, in a tread region between tread ground contact ends 2, 2 of the tire 1, on both sides in the tire width direction of the polygonal block group Gb formed as described above, blocks which are demarcated by circumferential main grooves 5, 6, widthwise lateral groove 7, 8, and the first and second thin grooves 3a, 3b (hereinafter referred to as "side blocks 9") are arranged in the circumferential direction.

These side blocks 9 are provided as a side block row SB1 between the polygonal block group Gb and the circumferential main groove 5 and as a side block row SB2 between the polygonal block group Gb and the circumferential main groove 6. The side block row SB1 consists of first side blocks 9a and the side block row SB2 consists of second side blocks 9b.

The side blocks 9 (9a and 9b) are formed to be larger in ground contact area than the polygonal blocks 4.

When the tire is loaded, cornering or an applied load from a rim may cause collapse of the blocks on a shoulder side and a force may be applied from the outside toward the inside in the tire width direction, as a result of which the polygonal blocks 4 in a tread central part may be subjected to the load. In this regard, if the ground contact area of the side blocks 9 (9a and 9b) which are circumferentially formed to surround the polygonal block group Gb as described above is increased to thereby increase rigidity of the blocks, the side blocks 9 (9a and 9b) absorb the force applied from the outside in the tire width direction, and hence it is possible to restrain the force applied from the outside in the tire width direction to the polygonal blocks 4, which are located closer to the tread central part than the side blocks 9 (9a and 9b). As a result, it is possible to make the polygonal blocks 4 located between the side blocks 9a and 9b contact with the ground in a good condition and thus to effectively exert the on-ice and on-snow performance as described above.

The polygonal blocks 4 and the side blocks 9 are preferably formed with the sipes as shown in FIGS. 1(a) and 1(b). By forming the sipes, it is possible to improve a water removing effect in the central region of each block and to utilize the edge effect of each block to thereby improve the on-ice and on-snow performance. Further, forming the sipes can make it possible to improve flexibility and hence the ground contact performance of the tread. However, such sipes do not necessarily have to be formed but may be formed as appropriate. If the sipes are not formed, the rigidity of each block may be increased, thereby preventing the blocks from easily collapsing.

Here, since the side blocks 9 (9a and 9b) are formed on both sides of the polygonal block group Gb which are formed close to the tread central part, the side blocks 9 (9a and 9b) are more likely to be subjected to the force applied from the outside toward the inside in the tire width direction. That is to say, the force applied from the outside toward the inside in the tire width direction easily causes deformation of the blocks, and hence partial wear of the blocks. Further, since the side blocks 9 (9a and 9b) are located outside the polygonal block group Gb in the tire width direction, they are more likely to be subjected to the load upon cornering, and thus better cornering performance is required.

However, if larger blocks are used on both sides of the polygonal blocks in order to increase the rigidity, the polygonal blocks between these larger blocks cannot flexibly move and the effects including the on-ice and on-snow performance as described above cannot be fully achieved.

Thus, in the pneumatic tire according to the present invention, with regard to the side blocks located on both sides of the polygonal block group Gb, the side blocks on one side and side blocks on the other side as viewed in the tire width direction are formed to be different in length in the circumferential direction.

The rigidity of the side blocks can be increased by increasing the length in the circumferential direction and hence the size of the side blocks, as a result of which it is possible to prevent the partial wear of the side blocks and improve the cornering performance. By contrast, edge components of the blocks are increased by decreasing the length in the circumferential direction and hence the size of the side blocks, as a result of which it is possible to improve the on-ice and on-snow traction performance, braking performance, and the like as is the case in the adjacent polygonal blocks.

This is, for example, effective in the tire with a prescribed mounting direction and a camber angle, when the side block which is longer in the circumferential direction is arranged on the inside when mounted and the side block which is shorter in the circumferential direction is arranged on the outside when mounted.

In this way, with the two side blocks which are located on both sides in the tire width direction of the polygonal blocks and differ in block property, it is possible not only to improve partial wear resistance of all the blocks but also to allow the polygonal blocks located in the tread central region to work more effectively.

In this case, a ratio of the length in the tire circumferential direction between two side blocks located on both sides in the tire width direction of the polygonal blocks is preferably 1:1.1 to 1:5. Further, the ratio of the length in the tire circumferential direction between the side block which is shorter in the tire circumferential direction and the polygonal block is preferably 1:1.3 to 1:3.

With the above-described ratio, the side block which is longer in the circumferential direction has sufficiently high rigidity, whereas the side block which is shorter in the circumferential direction has increased edge components and achieves an effect similar to that of the polygonal blocks, and the polygonal blocks becomes flexibly movable.

It is preferred that the polygonal block group Gb have a center in the tire width direction GbC, which is offset from a tire equatorial plane C in such a manner that a distance in the tire width direction $x_1$ between the first side block row SB1 and the tire equatorial plane C is larger than the distance in the tire width direction $x_2$ between the second side block row SB2 and the tire equatorial plane C.

Specifically, for example as shown in FIG. 1(a), the polygonal block group Gb is arrange in such a manner that the center in the tire width direction GbC of the polygonal block group Gb is offset with respect to the tire equatorial plane C. That is to say, in this example, the polygonal block group Gb is arranged to have a length in the tire width direction asymmetrical with respect to the tire equatorial plane C, and a line drawn through the center in the tire width direction GbC of the polygonal block group Gb, i.e. a midpoint of the width GbW of the polygonal block group, and parallel to the tire equatorial plane C is located within the tread ground contact width excluding the equatorial plane C. In other words, given the distance in the tire width direction $x_1$ between a center in the tire width direction SB1C of the first side block row SB1 (line drawn through the central part in the tire width direction of the first side block row SB1 and parallel to the equatorial plane C) and the tire equatorial plane C, and the distance in the tire width direction $x_2$ between a center in the tire width direction SB2C of the second side block row SB2 (line drawn through the central part in the tire width direction of the second side block row SB2 and parallel to the equatorial plane C) and the tire equatorial plane C, when comparing $x_1$ and $x_2$, $x_1 > x_2$.

In the present invention, in terms of such a block arrangement, the side blocks are formed in such a manner that a length in the circumferential direction $y_1$ of the first side block 9a of the side block row SB1 is longer than a length in the circumferential direction $y_2$ of the second side block 9b of the side block row SB2. That is to say, within the tread ground contact width shown in FIG. 1(a), the length in the circumferential direction of the side block located closer to the outside in the tire width direction is longer than the length in the circumferential direction of the side block located closer to the inside in the tire width direction (closer to the tread central part).

The blocks located on the shoulder side of the tread is subjected to a lateral force from the outside in the tire width direction, in particular upon cornering. Thus, by increasing the rigidity of the side blocks on the shoulder side of the tread in this way, it is possible to restrain the collapse of the side blocks and improve the cornering performance. By contrast, the side blocks located closer to the tread central part have an increased number of widthwise lateral grooves formed therein and are configured to have the shorter length in the circumferential direction and relatively small size. With this configuration, the block edges are increased, and as a result of which the on-ice and on-snow traction performance and braking performance can be improved, as with the adjacent polygonal blocks.

In the side block row SB1 comprising the first side blocks 9a, which have the relatively longer length in the circumferential direction, the widthwise the number of lateral grooves 7 formed to demarcate the side blocks can be decreased so that the widthwise lateral grooves 7 have accordingly a groove width larger than that of the widthwise lateral grooves 8. For example, as shown in FIG. 1(a), when two side blocks 9b of the side block row SB2 sandwiching one widthwise lateral groove 8 in the circumferential direction are connected so as to fill a groove space of the widthwise lateral groove 8, the resulting shape corresponds to one side block 9a included in the side block row SB1. This will enable a groove volume of the widthwise lateral groove 7 to be ensured and the on-snow traction braking performance to be improved. Specifically, the widthwise lateral grooves 7 of the side block row SB1 preferably have a width of 3 mm to 8 mm.

By contrast, in the side block row SB2 comprising the second side blocks 9b, which have the relatively shorter length in the circumferential direction, the groove width of the widthwise lateral grooves 8 may be decreased in order to increase the block rigidity. Thus, the widthwise lateral grooves 8 of the side block row SB2 preferably have a width of 1 mm to 5 mm.

In this way, depending on the target performance of the tire, the groove width of the widthwise lateral grooves can be appropriately changed.

In this case, it is preferred that the center in the tire width direction GbC of the polygonal block group Gb be located in a region having a width of 50% of the tread ground contact width TW with the tire equatorial plane C as a center.

As described above, the polygonal blocks can improve the on-ice and on-snow performance by its edge effect and good ground contact performance. Thus, by arranging the polygonal blocks in the tread central position which has the most large ground contact area with respect to the ground surface, functionality of the polygonal blocks can be fully achieved.

With regard to the shape of the side blocks, as shown in FIG. 1(a), it is preferred that side walls facing the circumferential main grooves 5 and 6 have a linear shape, and side walls facing the polygonal blocks have a zigzag shape corresponding and complementary to the shape of the polygonal blocks so as to secure the groove width of the thin grooves.

The linearly formed circumferential main grooves allow for suppression of partial wear and high draining performance, and further, improved straight running stability on ice and on snow. On the other hand, the side walls facing the polygonal block group Gb are provided so as to form grooves following the shape of the polygonal blocks 4, as a result of which grooves of the same shape and width as the grooves surrounding the polygonal blocks 4 (i.e. the first thin grooves 3a and the second thin grooves 3b) can be secured between the polygonal blocks 4 and the side blocks 9 (9a and 9b). Thus, the polygonal blocks adjacent to the side blocks can also have an effect similar to that of other polygonal blocks.

Figure 2:
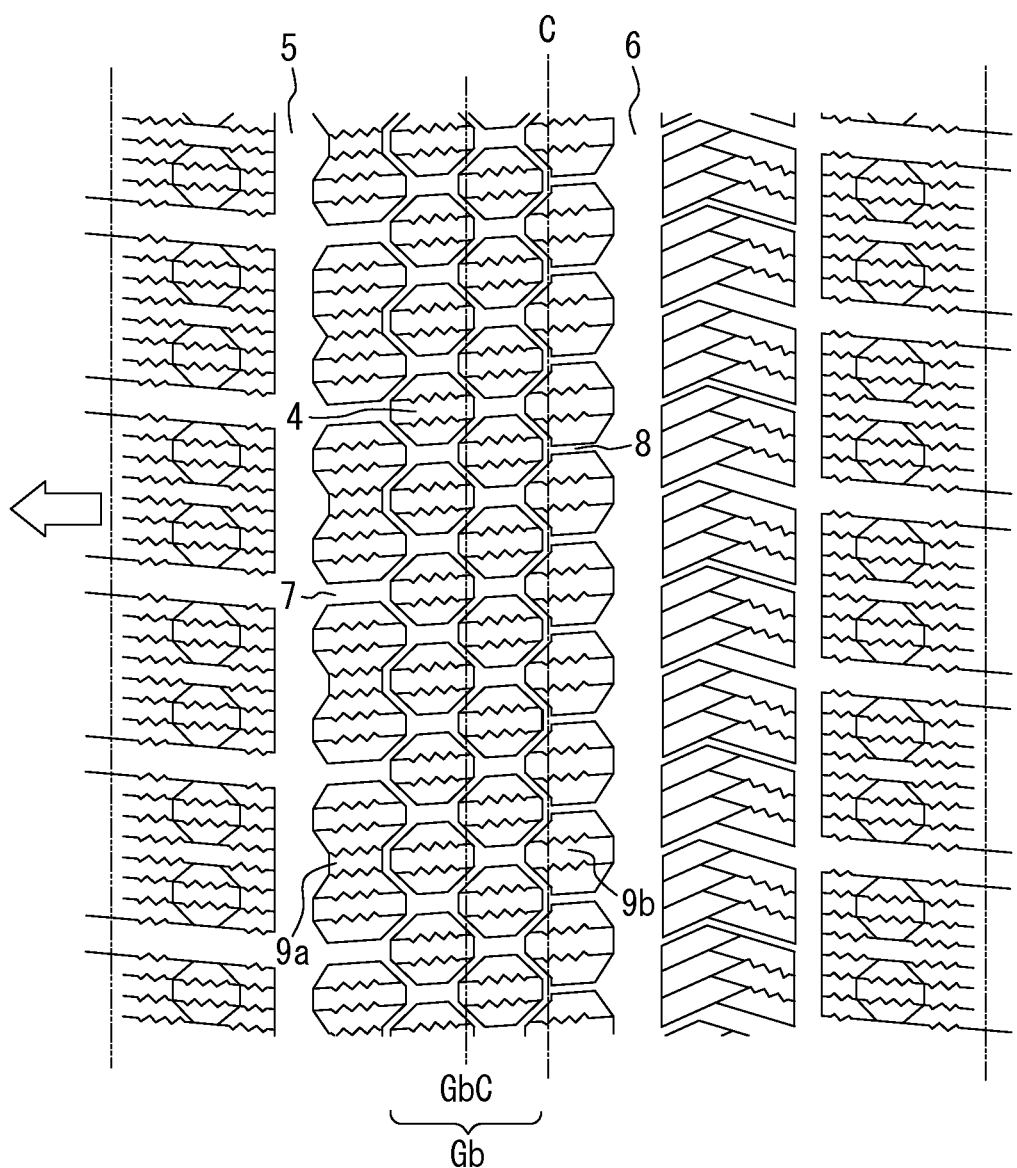
FIG. 2 is a partially developed view illustrating the tread pattern of another embodiment of the pneumatic tire according to the present invention.

As seen from another example shown in FIG. 2, it is also possible to make the side walls of the side blocks facing the polygonal blocks have a zigzag shape corresponding and complementary to the shape of the polygonal blocks so as to secure the groove width of the second thin grooves 3b as with the case of FIGS. 1(a) and 1(b), and make the side walls facing the circumferential main grooves 5 and 6 also have a zigzag shape like the shape of the side walls facing the polygonal blocks.

If the side blocks also have a polygonal shape, the total edge length and edge direction (number of edges facing different directions) can be increased, as a result of which it is possible to improve the on-ice and on-snow performance of the whole tire by the effect similar to that of the polygonal blocks.

In this way, the shape of the polygonal blocks and the side blocks can be appropriately changed depending on the target performance of the tire. Thus, with regard to the side blocks, although FIG. 2 shows the configuration in which the side walls facing both of the circumferential main grooves 5 and 6 have a zigzag shape, one of the side walls may have a zigzag shape and the other may have a linear shape.

Further, although not shown here, when the side walls facing the circumferential main groove 6 has a linear shape as shown in FIG. 1(a), for the purpose of improving the on-snow performance, a part of the linear shape may include a lug groove or a bottom-raising block may be provided in the main groove.

It is preferred that the first thin grooves 3a and the second thin grooves 3b demarcating the polygonal blocks 4 be configured to have a groove depth smaller than that of the circumferential main grooves 5 and 6 demarcating the side blocks 9a and 9b.

Since the polygonal blocks 4 have a relatively small ground contacting area, the rigidity of the polygonal blocks 4 is lower than that of the side blocks 9. In this case, by making the first thin grooves 3a and the second thin grooves 3b demarcating the polygonal blocks 4 shallower than the circumferential main grooves 5 and 6 to thereby increase the rigidity of the polygonal blocks 4, the running stability can be improved. As a result, the ground contact performance of the polygonal blocks 4 is stabilized, and thus the on-ice and on-snow performance by the polygonal blocks can be more effectively achieved. In this way, such a shallowness of the first thin grooves 3a and the second thin grooves 3b makes it possible to improve mainly the handling performance such as the dry performance/wet performance/on-ice performance/on-snow performance and on-ice braking performance/partial wear resistance.

EXAMPLE

Next, prototypes of an example tire according to the present invention and a comparative example tire having a polygonal block group in the tread central region and side blocks of substantially the same size in the circumferential direction were manufactured. The prototypes were used to carry out performance evaluation on dry performance, wet performance, on-ice performance, on-snow performance, and partial wear resistance of blocks. The result is given below.

The example tire is a radial tire for a passenger car with a size of 195/65R15 provided with the polygonal block group and side block rows shown in FIGS. 1(a) and 1(b). This tire has a block group with a plurality of independent blocks densely arranged and demarcated by grooves in a part of a tread section. Each of the blocks has a substantially octagonal surface contour shape, each part of which has a dimension as follows.

Figure 5:
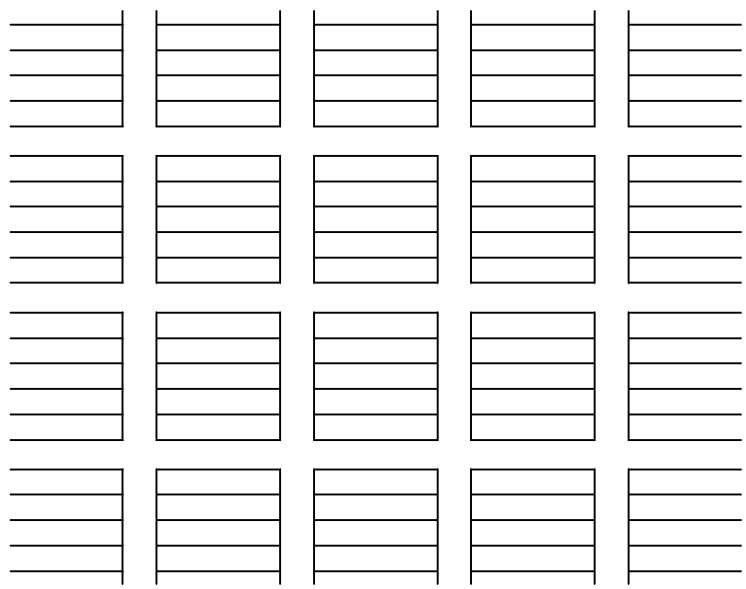
FIG. 5 is a partially developed view illustrating the tread pattern of a conventional tire.

Circumferential main grooves: from the left in the FIG. 1(a), 5 mm (main groove 5), 12 mm (main groove 6), and 7 mm.

A depth of the circumferential main grooves: 9 mm.

A length in the circumferential direction of a polygonal block (BL): 13.0 mm.

A length in the width direction of the polygonal block (BW): 15.6 mm.

A distance between the polygonal blocks adjacent to each other in the tread circumferential direction (BGL): 3.4 mm.

A distance between the polygonal blocks adjacent to each other in the tread width direction (BGW): 9.5 mm.

A height of the polygonal block (BH): 7 mm.

A reference pitch length (PL): 32.9 mm.

A width of the polygonal block group and side block rows: 52.1 mm

A proportion of the polygonal block group to a ground contact width: 32%.

A length of a first side block (outer side) y1: 28.8 mm.

A length of a second side block (center side) y2: 14.9 mm.

An area of the polygonal block: 154 mm$^2$.

A center position in the width direction of the polygonal block group: 15.0 mm from a tire equatorial plane to the inside when mounted to a vehicle (a center position of a tire half width is located at 40 mm from the tire equatorial plane).

Figure 3:
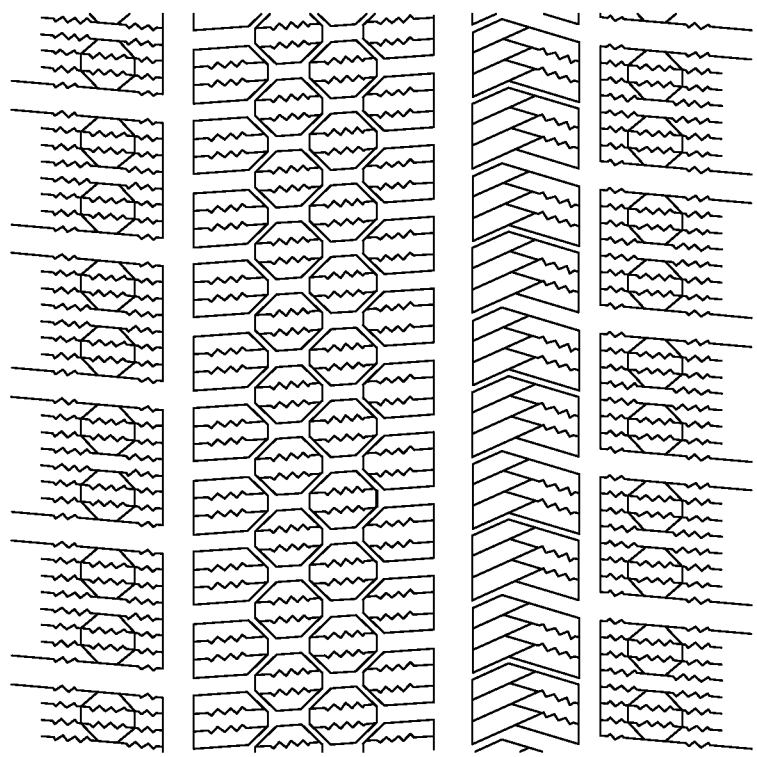
FIG. 3 is a partially developed view illustrating the tread pattern of a comparative example tire.

By contrast, the comparative example tire has a tread pattern shown in FIG. 3. The length of the first side block (outer side) is 14.9 mm and the length of the second side block (center side) is 14.9 mm so that the first side block and the second side block have the same length in the circumferential direction, but otherwise identical to the above-mentioned example tire in configuration. The result is shown in Table 1 below.

TABLE 1

|  | Example 1 | Comparative Example |
|---|---|---|
| Dry handling | 110 | 100 |
| Wet handling | 107 | 100 |
| On-ice handling | 106 | 100 |
| On-snow handling | 105 | 100 |
| Partial wear resistance | 115 | 100 |

The dry handling, wet handling, on-ice handling, and on-snow handling listed above indicate indices of measurement values from evaluation of a test driver's feeling when the tires are used in various running modes on a circuit course in a dry state, wet state, ice state, and snow state. The partial wear resistance listed above indicates indices of measurement values of a stepped wear amount when running 5000 km in various running mode on a public road in the dry state.

The evaluation shown in Table 1 suggests that with respect to 100 of the comparative example tire, the greater the numerical value of Example 1, the more the dry performance, wet performance, on-ice performance, on-snow performance, and partial war resistance of the blocks were improved.

From the result in Table 1, it was found out that when the side blocks differed in length in the circumferential direction and the side blocks on the outside in the tire width direction was longer in length in the circumferential direction, the example tire was superior to the comparative example tire in terms of all of the dry performance, wet performance, on-ice performance, on-snow performance, and partial wear resistance of the blocks.

It is preferred that the surface contour shape of the polygonal blocks 4 arranged in a tread ground contact width be polygonal shape with five or more sides. With this shape, it is possible to ensure a sufficient ground contact area of the tire surface. Further, while each individual polygonal block is independently movable, adjacent blocks can support each other to prevent collapse of the blocks.

It is further preferred that the surface contour shape of the polygonal blocks 4 is substantially octagonal as shown in FIGS. 1(a) and 1(b). If the number of corners is too small, the blocks cannot collapse in multiple directions, leading to poor flexibility. If the polygonal shape with eight or more sides is used, each side becomes so short that only a small surface is in contact with the adjacent block when collapsing, which makes it difficult for the blocks to support each other. Thus, when the surface contour shape is substantially regular octagon, the blocks can collapse in multiple directions and sufficiently provide mutual support with the adjacent blocks. When the surface contour shape is regular octagon, first thin grooves 3a demarcating the polygonal blocks 4 preferably have a distance in the circumferential direction wide enough not to be blocked by the adjacent blocks when they are in contact with a ground surface. By contrast, second thin grooves 3b, which intersect the first thin grooves 3a and are inclined relative to the equatorial plane, are preferably formed in such a manner that adjacent blocks are in close proximity to each other so as to block the grooves when they are in contact with the ground surface.

However, the surface contour shape of the polygonal blocks of the present invention is not necessarily limited to the above-mentioned shape. The polygonal blocks only have to be demarcated by the grooves and freely and independently movable so that each polygonal block is not restrained by adjacent polygonal blocks and has flexibility when they are in contact with the ground surface.

Figure 4:
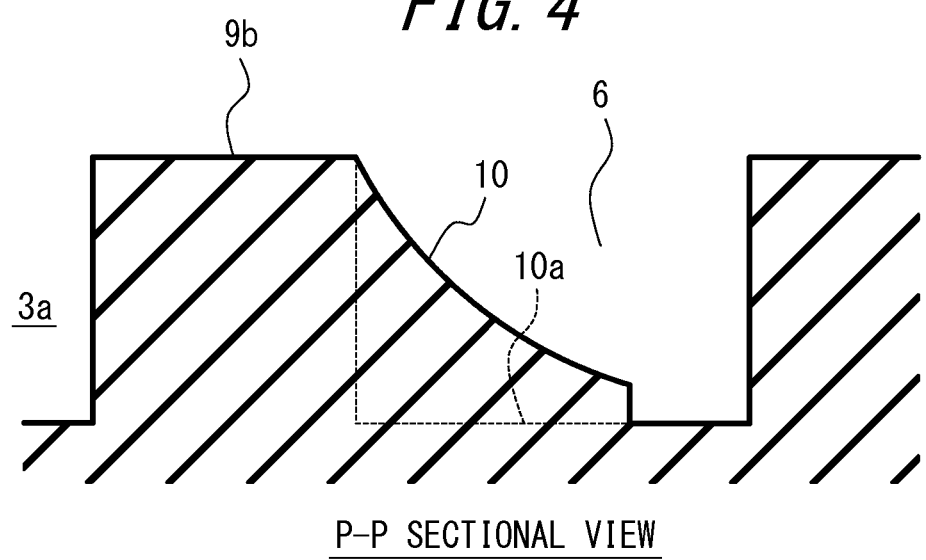
FIG. 4 is a fragmentary view taken along the line P-P and seen in the direction of the arrow of FIG. 1(a), illustrating a bottom-raising block provided in a circumferential main groove.

The circumferential main grooves 5 and 6 demarcating the side blocks 9 and 9b may be, as shown in FIG. 4, provided with a bottom-raising block (grooving) 10 therein. FIG. 4 is a fragmentary view taken along the line P-P and seen in the direction of the arrow of FIG. 1(a). In this embodiment, the circumferential main groove 6 is provided with the bottom-raising block 10, which is formed with a pocket 10a extending substantially in the tire width direction. With this configuration, a block edge is also formed in the main groove, as a result of which in particular the on-snow performance can be improved. Further, since an opening of the main groove has a sufficient groove width, hydroplaning performance is not deteriorated. Note that, this bottom-raising block may be provided in one of the circumferential main grooves (5 or 6) or in both of the circumferential main grooves (5 and 6).

The arrangement, shape, and the like of the polygonal blocks, the side blocks, and the like in the above-described example are shown by way of example only, and other embodiments are possible. It should be noted that the number of the block rows, the number of the blocks, shape, size, and the like are an example for illustrating the tire according to the present invention, and can be appropriately modified without departing from the spirit of the present invention.

INDUSTRIAL APPLICABILITY

According to the present invention, when polygonal blocks are arranged on a tread, lengths in the circumferential direction of the side blocks on both side of the polygonal blocks are adjusted to ensure sufficient block rigidity. As a result, suppression of partial wear of the blocks and further improvement of performance of the whole tire such as on-snow performance, dry performance, and wet performance can be achieved.

REFERENCE SIGNS LIST 1 tire
2 ground contact end
3a, 3b thin groove
4 polygonal block
5, 6 circumferential main groove
7, 8 widthwise lateral groove
9a, 9b side block
10 bottom-raising block
C equatorial plane
Gb polygonal block group
GbC center in the tire width direction of the polygonal block group
GbW length in the tire width direction of the polygonal block group
SB1, SB2 side block row
TW tread ground contact width

The invention claimed is:
1. A pneumatic tire comprising:
a polygonal block group is provided between two circumferential main grooves in a tread ground contact width, the polygonal block group comprising a plurality of polygonal blocks with five or more sides which are demarcated by thin grooves and arranged in at least two longitudinal rows and a plurality of lateral rows, the longitudinal rows being arranged so that the polygonal blocks included in adjacent longitudinal rows differ in phase from each other in a tire circumferential direction;
side block rows are provided, one on each of the two sides in the tire width direction of the polygonal block group, the side block rows comprising a plurality of side blocks which are demarcated by the circumferential main grooves, lateral grooves, and the thin grooves and arranged in the tire circumferential direction; and
a length in the tire circumferential direction of a first side block included in a first side block row provided on one side is larger than the length in the tire circumferential direction of a second side block included in a second side block row provided on the other side,
wherein a side of the first side block and the second side block facing the circumferential main grooves has a linear shape, and a side of the first side block and the second side block facing the polygonal blocks has a complementary shape corresponding to the shape of the adjacent polygonal blocks,
wherein a center in the tire width direction of the polygonal block group is offset from a tire equatorial plane, and a distance in the tire width direction between the first side block row and the tire equatorial plane is larger than the distance in the tire width direction between the second side block row and the tire equatorial plane.

2. A pneumatic tire according to claim 1, wherein the center in the tire width direction of the polygonal block group is located within a region having a width of 50% of the tread ground contact width from the tire equatorial plane.

3. A pneumatic tire according to claim 1, wherein the thin grooves demarcating the polygonal blocks have a depth smaller than that of the circumferential main grooves.

4. A pneumatic tire according to claim 1, wherein each of the polygonal blocks has an actual ground contact area of 50 mm² to 250 mm².

5. A pneumatic tire according to claim 1, wherein with regard to the polygonal blocks, given that a reference pitch length of the polygonal block group is PL (mm), a width of the polygonal block group is GbW (mm), a number of the polygonal blocks existing in a reference zone of the polygonal block group demarcated by the reference pitch length PL and the width GbW is a, and a negative ratio within the reference zone is N %, a block number density S per unit actual ground contact area of the polygonal block group given by:

$$S = a/(PL \cdot GbW \cdot (1 - N/100))$$

is in the range of 0.003 pieces/mm² to 0.04 pieces/mm².

6. A pneumatic tire comprising
a polygonal block group is provided between two circumferential main grooves in a tread ground contact width, the polygonal block group comprising a plurality of polygonal blocks with five or more sides which are demarcated by thin grooves and arranged in at least two longitudinal rows and a plurality of lateral rows, the longitudinal rows being arranged so that the polygonal blocks included in adjacent longitudinal rows differ in phase from each other in a tire circumferential direction;
side block rows are provided, one on each of the two sides in the tire width direction of the polygonal block group, the side block rows comprising a plurality of side blocks which are demarcated by the circumferential main grooves, lateral grooves, and the thin grooves and arranged in the tire circumferential direction; and
a length in the tire circumferential direction of a first side block included in a first side block row provided on one side is larger than the length in the tire circumferential direction of a second side block included in a second side block row provided on the other side, wherein a side of at least one of the first side block and the second side block facing the circumferential main groove has a zigzag shape, and a side of the first side block and the second side block facing the polygonal blocks has a complementary shape corresponding to the shape of the adjacent polygonal blocks.

* * * * *